Aug. 16, 1960     I. C. MADSEN     2,949,332
DEVICE FOR DISMOUNTING AND MOUNTING TIRE RIMS
Filed Feb. 28, 1958
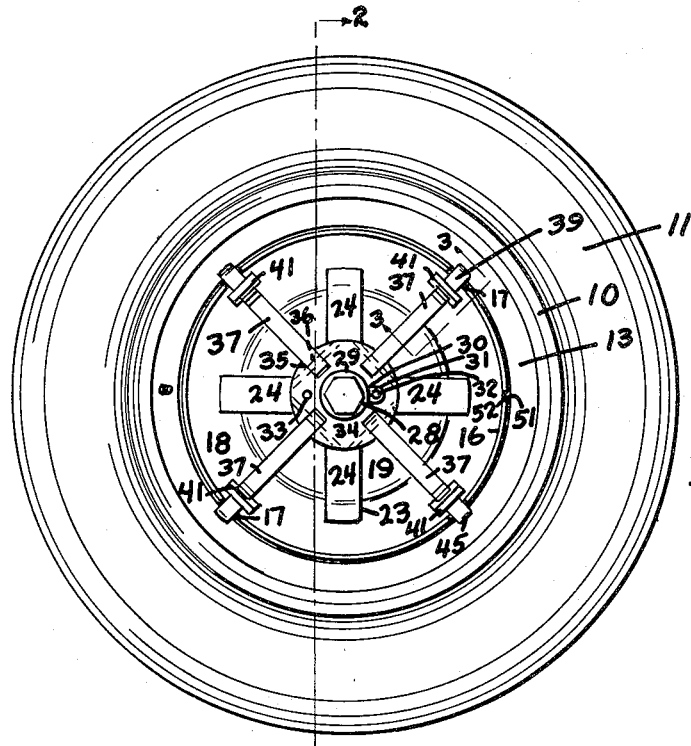
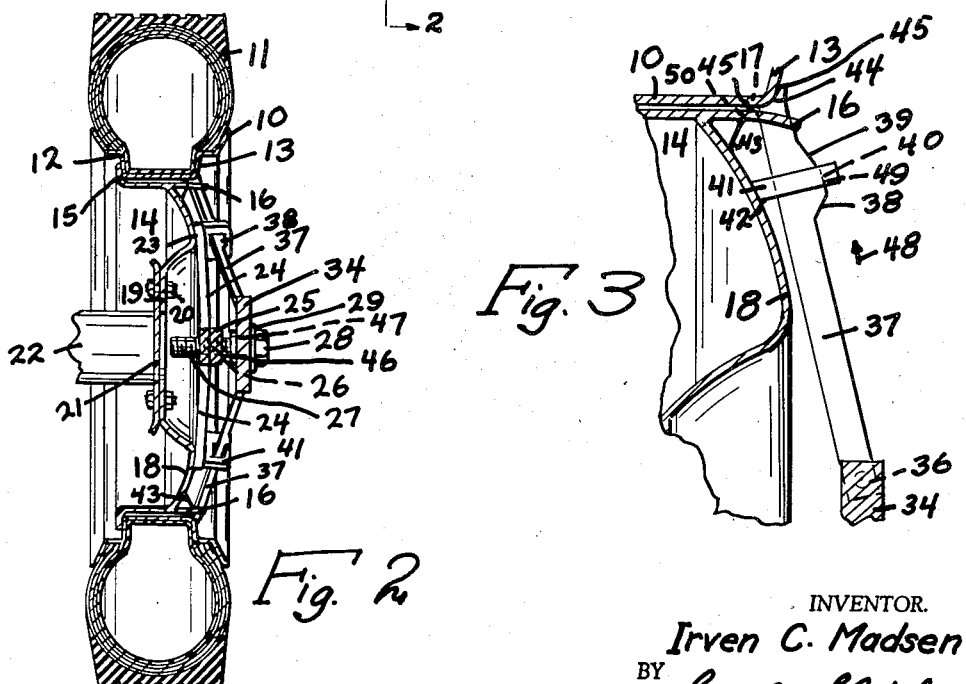
INVENTOR.
Irven C. Madsen
BY Sam J. Slotky
ATTORNEY

United States Patent Office 2,949,332
Patented Aug. 16, 1960

2,949,332

DEVICE FOR DISMOUNTING AND MOUNTING TIRE RIMS

Irven C. Madsen, Burbank, S. Dak.

Filed Feb. 28, 1958, Ser. No. 718,243

2 Claims. (Cl. 301—11)

My invention pertains to a device for dismounting or mounting tire rims.

An object of my invention is to provide a device wherein only a single screw need be turned to completely dismount the rim from the shaft, thereby eliminating the need for unscrewing or screwing on several nuts.

A further object of my invention is to provide an arrangement which is easily and quickly mounted and located in proper position, and to further provide means wherein the rim is securely locked when in use.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a forward elevation of a rim and tire using my arrangement,

Figure 2 is a sectional view taken substantially along the lines 2—2 of Figure 1, and Figure 3 is an enlarged sectional view taken along the lines 3—3 of Figure 1.

My invention contemplates the provision of a simple device which will allow the dismounting or mounting of a tire rim in a minimum of time in that only a single centrally positioned screw arrangement need be turned for this purpose.

I have used the character 10 to designate a tire rim, the character 11 indicating the tire itself. The rim 10 includes the usual indented annular portion at 12 on the inner side and the similar portion 13 on the outer side thereof.

The device of my invention comprises an annular cylindrical ring 14 having the integral flange 15 which is adapted to bear against the portion 12 of the rim 10, the ring 14 also extending into the further annular portion 16 having the slots 17 therein.

Extending from the ring-shaped member 14 is the inwardly extending disc portion 18 which extends into the further portion 19 which can be attached by the usual bolts 20 to the wheel framework 21 which is broken away for clarity, and which framework contains the usual brake drum and the like, the member 21 being attached to the axle 22 for driving the wheel.

Welded at 23 to the disc portion 18 are the cross straps 24 to which is welded the centrally positioned nut 25, the nut 25 and the cross straps at their central portion including the threaded portion 26 which receives the heavy threaded bolt 27, the bolt 27 terminating in the bolt head 28 having the circular portion 29 formed integrally therewith, and hinged to the portion 29 at 30 is a small ear 31 which receives the pin 32 which is received in an opening 33 at either side of the outer disc member 34, the pin 32 serving to lock the bolt 27 after the arrangement has been tightened.

The disc member 34 includes the slots at 35, and pivotally secured within the slots 35 by means of the pins 36 are the ends of the radially positioned bars 37, which bars include the tapered portions at 38 and 39, the bars and these portions passing through the slots 40 which are provided in the keeper members 41, which members 41 are welded at 42 to the disc 18.

Attached between the portions 16 and the member 18 are the sloping surfaces 43, and the bars 37 terminate in the arcuate ends 44 having the extending lips 45.

Securely attached to the bolt 27 is a collar 46 (see Figure 2).

The device is operated in the following manner. For removing the rim from the wheel, the bolt head 28 is merely rotated in the direction opposite to its attaching motion, the collar 46 keeping the disc member 34 in position, the bolt 27 passing through the opening 47 in the disc 34, and by continued rotation the disc 34 will gradually separate from the members 24 and the bars 37 will then be drawn radially inwardly so that the arcuate portions 44 will no longer engage the rim portions 13, and in this way the rim carrying the tire can be readily removed or dismounted, and after the tire has been repaired, etc., and it is desired to mount the rim again, the rim is merely placed in position and the bolt head 28 is rotated in the reverse direction, whereby the arcuate portions 44 of the bars 37 will approach the rim portion 13 until they are tightly engaged against the rim portion to thereby secure the rim in solid position, the pin 32 being used to lock the arrangement.

It will be noted that as the bars 37 travel in the direction of the arrow 48 (see Figure 3) the upper end 49 of the slot 40 will engage the sloping surfaces 39 so that this portion of the bars 37 will become tightly locked, the lower edge of the inner lip 45 passing along the lower surfaces 50 of the slots 17, so that as a result a very tight engagement is effected at the keepers 41 so that a portion of the strain imparted against the bars 37 will be absorbed by the keepers 41, thereby eliminating undue strain on the centrally positioned disc 34, etc.

To maintain the disc portion 18 against relative rotation with respect to the rim, I attach a small bead 51 to the inner rim portion which is received within the small cavity 52 provided in the ring-shaped portion 16, these members being easily aligned when installing the rim.

It will now be seen that I have provided the advantages mentioned in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A device for dismounting and mounting a tire rim comprising a disc, a tire rim mounted thereon, said disc including an annular flange adapted to engage the inner annular side of said rim, a plurality of radially positioned bars, keepers attached to said disc through which said bars pass, an outwardly movable centrally positioned member to which said bars are pivotally attached, the outer terminals of said bars being adapted to engage against outer portions of said rim to thereby lock said rim to said disc, said centrally positioned member having an opening, a bolt received through said opening, said bolt having a head bearing against said centrally positioned member, a collar attached to said bolt and being positioned adjacently to said centrally positioned member, cross straps secured to said disc, said bolt being threadably engaged with the central portions of said cross straps, said disc including an outer annular flange attached thereto, said outer flange having slots receiving the terminals of said bars, said bar terminals being arcuate to snugly receive said rim portions.

2. A device for dismounting and mounting a tire rim comprising a disc, a tire rim mounted thereon, said disc including an annular flange adapted to engage the inner annular side of said rim, a plurality of radially positioned bars, keepers attached to said disc through which said bars pass, an outwardly movable centrally positioned member to which said bars are pivotally attached, the outer terminals of said bars being adapted to engage against outer portions of said rim to thereby lock said rim to said disc, said centrally positioned member having an opening, a bolt received through said opening, said bolt having a head bearing against said centrally positioned member, a collar attached to said bolt and being positioned adjacently to said centrally positioned member, cross straps secured to said disc, said bolt being threadably engaged with the central portions of said cross straps, said disc including an outer annular flange attached thereto, said outer flange having slots receiving the terminals of said bars, said bar terminals being arcuate to snugly receive said rim portions, said keepers including vertically positioned slots, said bars including tapered surfaces engaging said slots as said bars are moved outwardly.

References Cited in the file of this patent

UNITED STATES PATENTS 1,412,337     Charles et al. _____ Apr. 11, 1922